Aug. 17, 1965  W. J. FANNING  3,201,056
WINDING APPARATUS
Filed Feb. 26, 1964  5 Sheets-Sheet 1
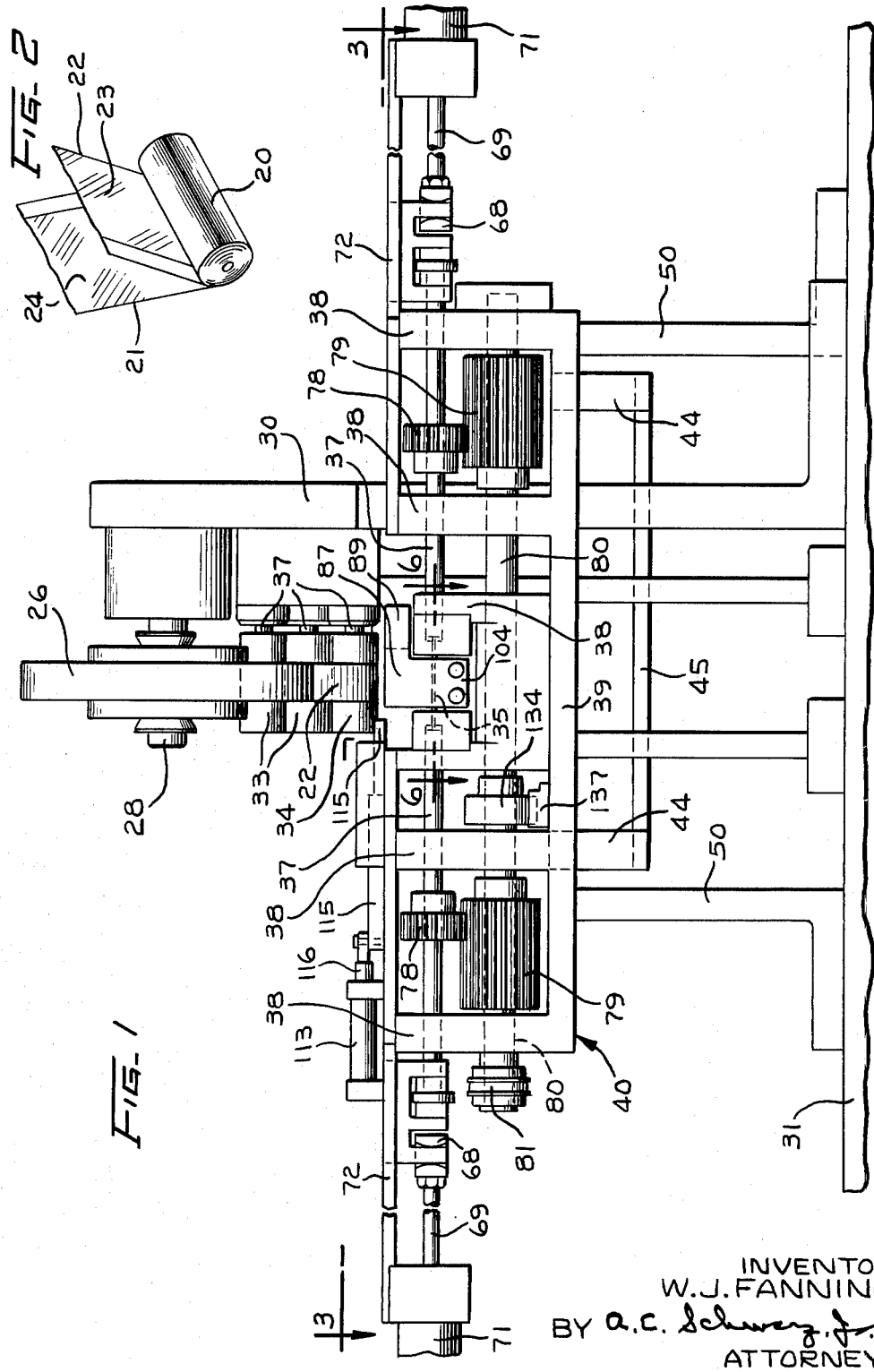
INVENTOR
W.J. FANNING
BY A.C. Schwerz, Jr.
ATTORNEY

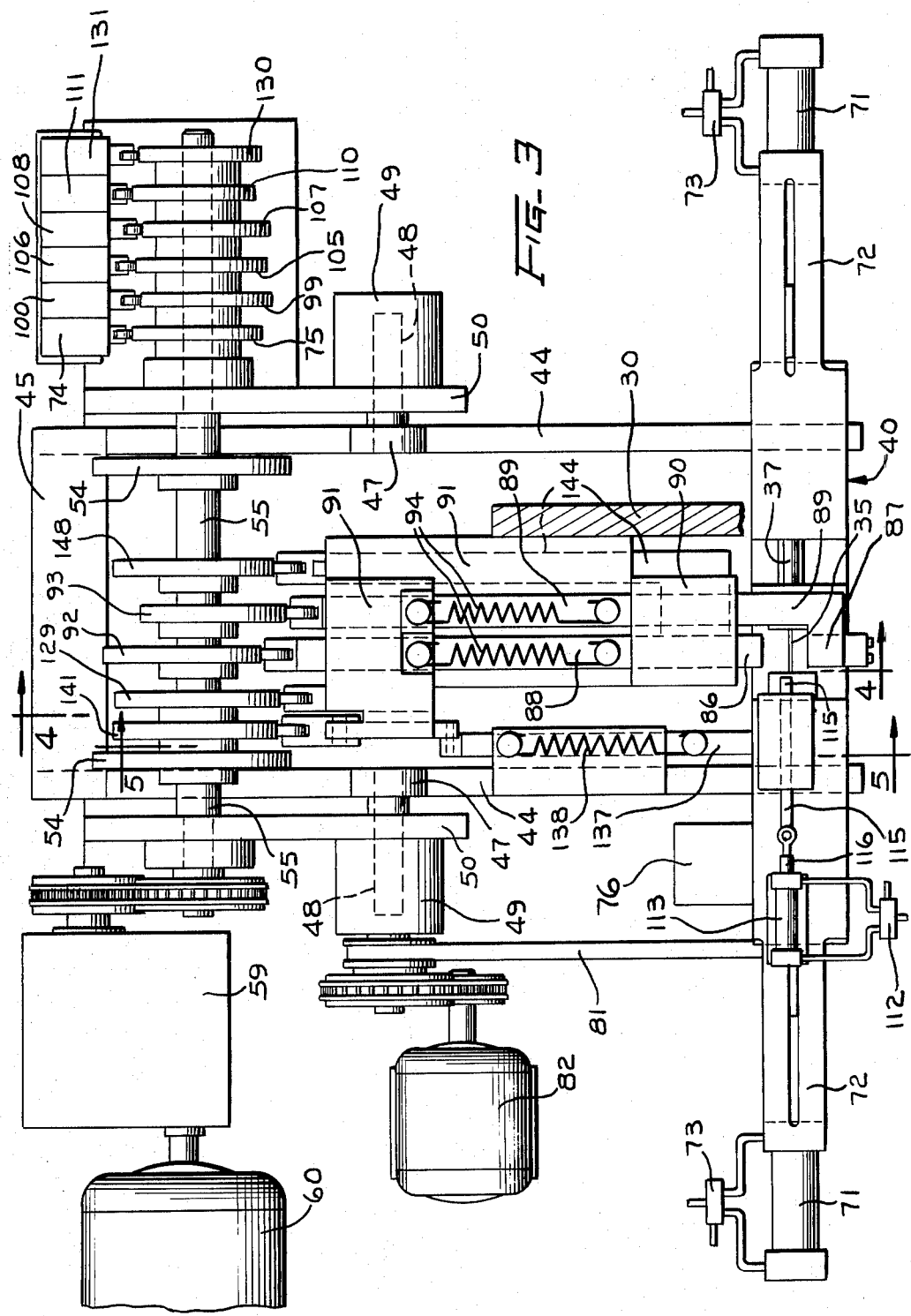

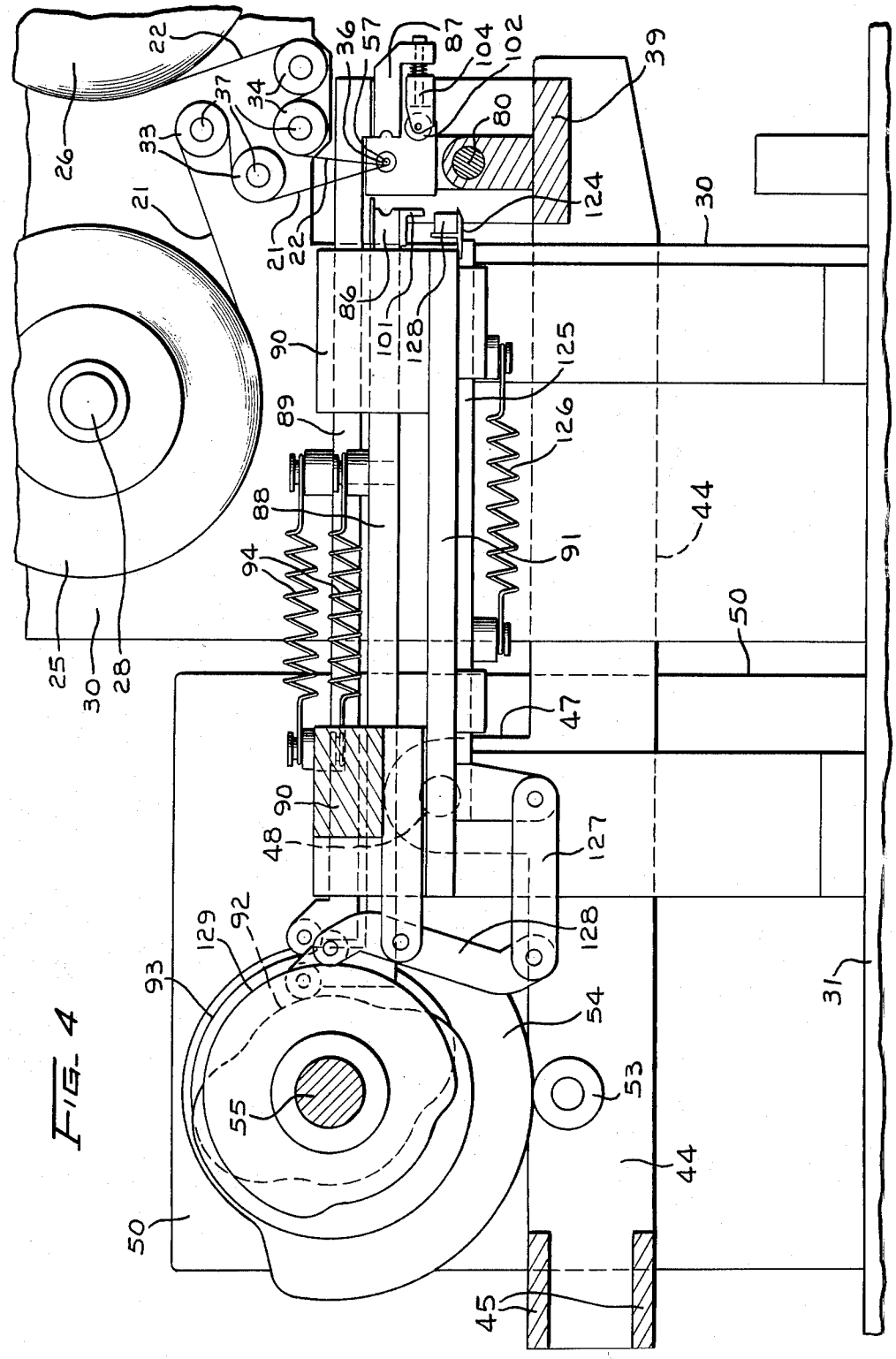

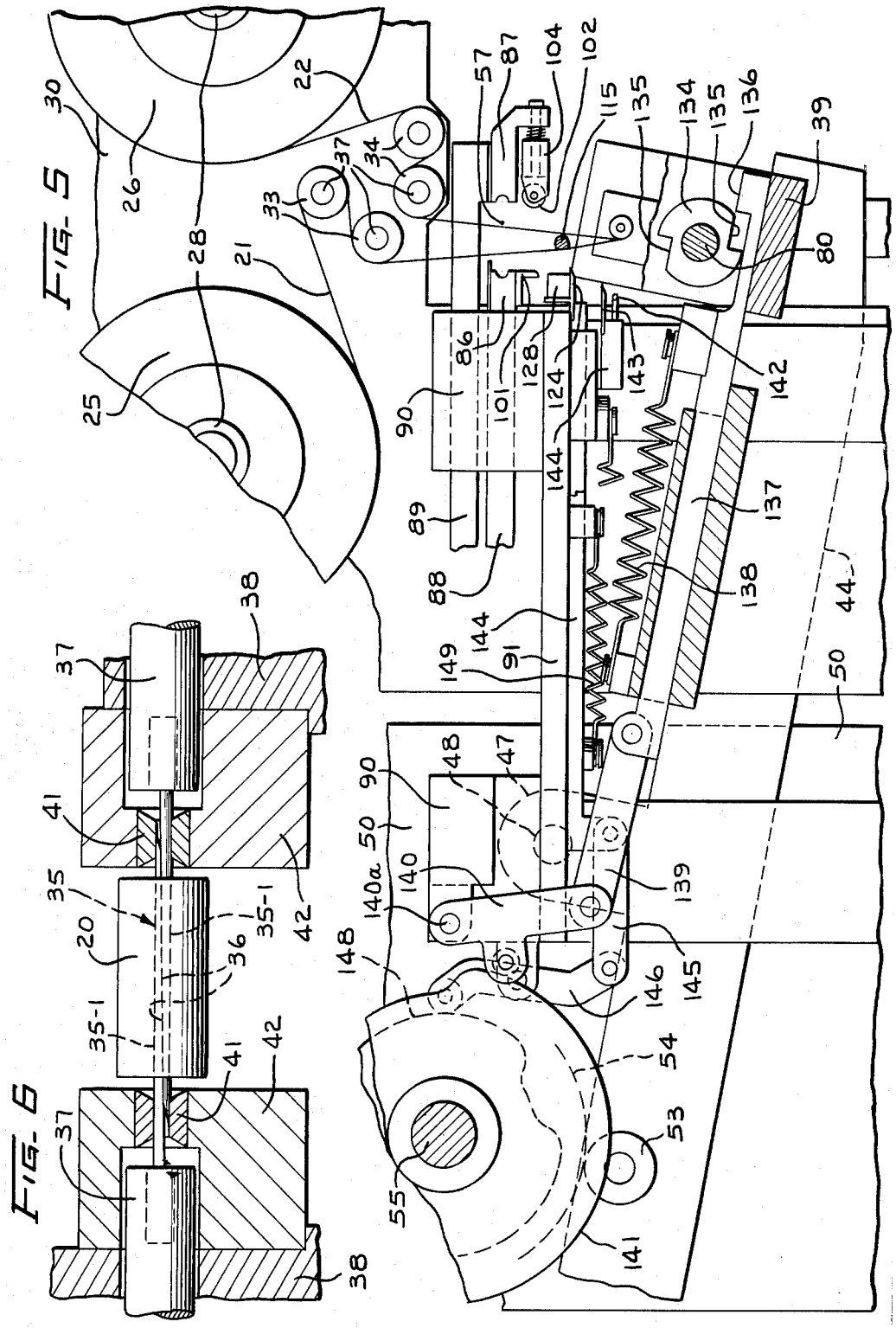

Aug. 17, 1965  W. J. FANNING  3,201,056
WINDING APPARATUS
Filed Feb. 26, 1964  5 Sheets-Sheet 5
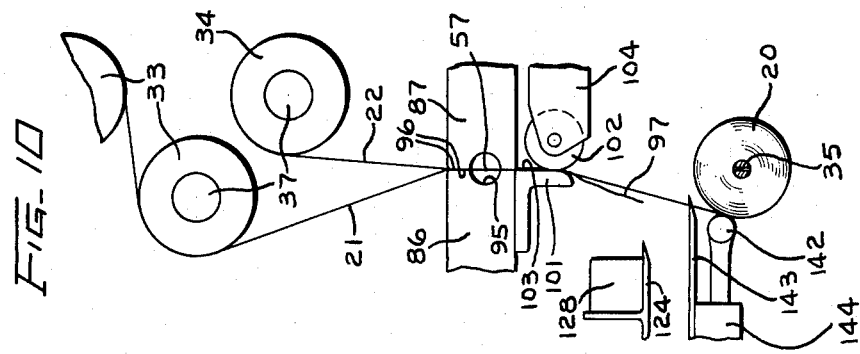
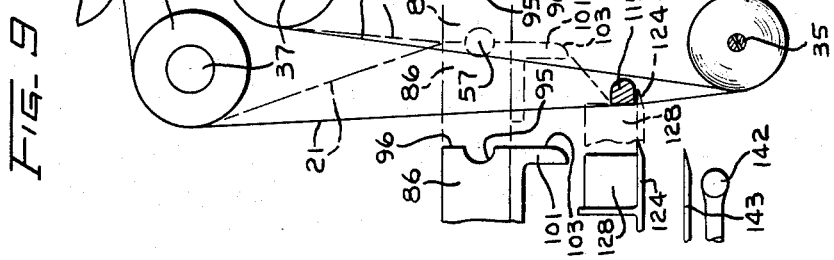
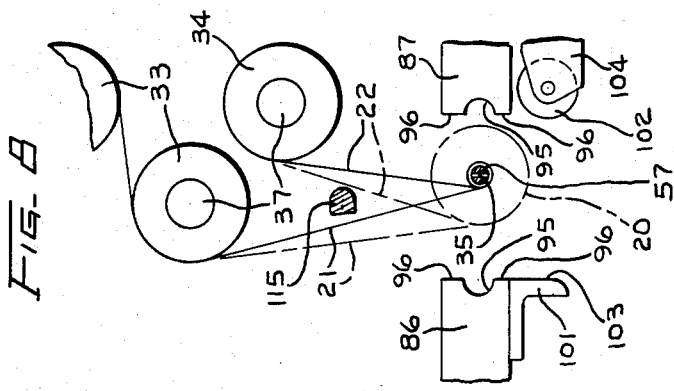
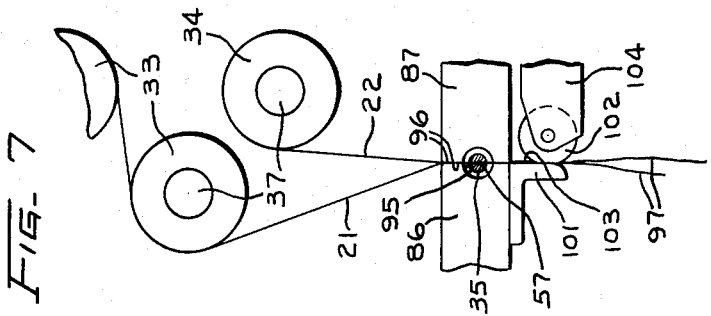

United States Patent Office 3,201,056
Patented Aug. 17, 1965

3,201,056
WINDING APPARATUS
William J. Fanning, Melrose Park, Ill., assignor to Western Electric Company, Incorporated, New York, N.Y., a corporation of New York
Filed Feb. 26, 1964, Ser. No. 347,479
9 Claims. (Cl. 242—56.1)

This invention relates to winding apparatus, and more particularly to an apparatus for winding capacitors automatically from a pair of metallized webs.

An object of the invention is to provide an apparatus having a single split arbor for winding material automatically.

Another object of the invention is to provide a winding apparatus having a pair of axially movable arbor sections rotatable about an axis and cooperable in a closed position to form a split arbor for winding a pair of converging webs thereon, and a pair of elements for positioning the webs in alignment with the axis of rotation to facilitate the movement of the arbor sections into winding engagement with the webs.

Another object of the invention is to provide members on the web-positioning elements engageable with the unsupported leading end portions of the webs for preventing the wrinkling thereof during the winding of such portions onto the arbor.

An apparatus illustrating certain features of the invention may include a pair of arbor sections mounted on a cradle in axial alignment with each other for axial movement to a closed position to form a longitudinally split arbor, and movable with the cradle to an upper position with the arbor in coaxial alignment with a fixed axis and to a lower position with the arbor disposed beneath the fixed axis. The arbor in the upper position is rotated through a prescribed number of revolutions to wind thereon predetermined lengths of a pair of capacitor-forming webs from supplies thereof, after which the arbor is stopped, a cut-off bar on the cradle is moved parallel to and above the arbor to a position between the diverging web, and the cradle is moved to the lower position with the arbor and the cut-off bar below the fixed axis. A serrated shear blade is then actuated and cooperates with the cut-off bar to at least partially shear one of the webs, and a resilient pad on the shear blade clamps the web against the cut-off bar to hold the end of the web supply after severance of the web. The arbor is then rotated through several revolutions to effect the severance of the one web and the winding of the trailing end thereof onto the capacitor, and the winding of several convolutions of the other web around the capacitor, after which a second shear blade and a sealing element are actuated to shear the second web and seal the trailing end thereof to the capacitor.

With the cradle in its lower position and prior to the severance of the webs from the capacitor, a pair of web-positioning elements, which are mounted for horizontal movement on opposite sides of the fixed axis, are sequentially actuated to move the diverging webs together in vertical alignment with the fixed axis so as to hold the leading end portions of the web supplies in proper position when the webs are severed. Subsequent to the severing of the webs, the arbor sections are withdrawn from the capacitor to effect the ejection of the latter and the cradle is raised to the upper position. Thereafter, the arbor sections are moved through clearance apertures in the web-positioning elements to the closed position with the webs therebetween. Rotation is then imparted to the arbors to initiate the winding of another capacitor, during a portion of which winding movement the web-positioning elements are separated from each other and the cycle of operation is automatically repeated.

Other objects, advantages and novel aspects of the invention will become apparent upon consideration of the following detailed description, in conjunction with the accompanying drawings, in which:

FIG. 1 is a front view of the apparatus with portions thereof broken away;

FIG. 2 is a perspective view of a partially wound capacitor of the type fabricated with the present apparatus;

FIG. 3 is a plan sectional view of the apparatus taken on the line 3—3 of FIG. 1;

FIG. 4 is a vertical sectional view of the apparatus taken along line 4—4 of FIG. 3;

FIG. 5 is a fragmentary vertical sectional view of the apparatus taken on line 5—5 of FIG. 3 and showing the cradle of the apparatus in the lower position and omitting parts of the apparatus to disclose more clearly the mechanisms for severing the second web and for sealing the web to the capacitor;

FIG. 6 is an enlarged plan sectional view of the apparatus taken on line 6—6 of FIG. 1 and showing the split arbor of the apparatus in closed position; and FIGS. 7 to 10 are enlarged fragmentary views of portions of the apparatus in different positions to illustrate different stages of the operation thereof.

The apparatus is designed to wind automatically capacitors 20 (FIGS. 2, 9 and 10) from a pair of metallized dielectric webs 21 and 22, the metallized electrodes 23 of each web being of less width than that of the web and extending along opposite edges of the webs to opposite ends of the capacitor. Supply rolls 25 and 26 of the webs (FIGS. 1 and 4) are supported on a pair of spindles 28 which are rotatably mounted on a vertical frame plate 30 secured to and extending upwardly from a horizontal base plate 31. The webs 21 and 22 from the supply rolls are guided respectively about pairs of rollers 33 and 34 to a winding arbor 35.

The arbor 35 is of the longitudinally split type comprising two arbor sections 35–1 (FIG. 6) which have substantially flat mating surfaces 36 for receiving the webs 21 and 22 therebetween and which are secured to shafts 37. As shown in FIG. 1, the shafts 37 are mounted for rotation and for axial movement in bearing apertures in supporting members 38 extending upwardly from a cross member 39 of a cradle or carrier 40. In the closed position the arbor sections 35–1 are rotatably supported in bearings 41 in members 42 which are mounted on a pair of the supporting members 38 and serve as stripping members for removing the capacitor 20 from the arbor sections as the arbor sections are withdrawn from the capacitor.

The cross member 39 of the cradle is supported on the forward ends of a pair of parallel longitudinal members 44 which are interconnected by cross members 45 at their other ends and have upwardly extending lugs 47 (FIG. 4) intermediate their ends. Trunnions 48 extending laterally from the lugs 47 of the members 44 are journaled in a pair of bearings 49 for supporting the cradle 40 for pivotal movement about a horizontal axis. The bearings 49 are formed on vertical frame plates 50 secured to and extending upwardly from the horizontal base plate 31.

Cam followers 53 on the longitudinal members 44 engage cams 54 on a cam shaft 55 and are actuated thereby to rock the cradle 40 and move the arbor 35 to an upper or winding position for rotation about its axis in coaxial alignment with a fixed axis 57 (FIGS. 1, 4, 7 and 8), and to a lower position with the arbor disposed below and parallel to the fixed axis 57 (FIGS. 5, 9 and 10) to facilitate the shearing of the webs and the positioning of the sheared ends of the webs relative to the axis 57. The cam shaft 55 is connected through an electrically operated clutch device 59 to a continuously operating motor 60.

Referring to FIG. 1, the arbor supporting shafts 37 are coupled through connectors 68 to piston rods 69 of fluid-operated actuators 71. The actuators 71 are secured to horizontal supporting arms 72 that are affixed to the vertical supports 38 of the cradle 40. Axial movement to and from closed and open positions is imparted to the arbor sections 35–1 by the admission of compressed air from a suitable source thereof selectively to opposite ends of the actuators 71 under control of electrically operated valves 73 (FIG. 3). These valves in turn are controlled by a switch 74, actuated by a cam 75 on the cam shaft 55. The switch 74 is part of a control device 76 indicated diagrammatically in FIG. 3.

Secured to the arbor supporting shafts 37 are gears 78 that mesh with elongated gears 79 secured to a drive shaft 80. The drive shaft 80 is rotatably mounted in the vertical supporting members 38 of the cradle 40 and is connected through suitable belt and pulley connections 81 to a motor 82 (FIG. 3) for imparting rotation to the arbor 35.

While the cradle 40 and the arbor 35 are in the lower position (FIGS. 9 and 10), the converging webs 21, 22 adjacent the axis 57 are moved together and supported in vertical position in the plane containing the axis 57 by a pair of positioning elements of jaws 86 and 87. As shown in FIGS. 3 and 4, the elements 86 and 87 are mounted in opposed relation to each other on the ends of slide bars 88 and 89, which are slidable horizontally in supports 90 on a horizontal frame plate 91 which is secured to the vertical plate 30. At the opposite ends thereof the slide bars 88 and 89 have cam followers which ride on cams 92 and 93 secured to the cam shaft 55. Springs 94 urge the slide bars against the cams and cooperate therewith to effect the reciprocation of the web-positioning elements 86 and 87 to and from closed and open positions in a predetermined sequence.

The opposed end portions of the web-positioning elements 86 and 87 (FIGS. 7 to 10) have central horizontal grooves or recesses 95 which in the closed position of the elements 86 and 87 provide clearance for the axial movement of the arbor sections 35–1. The end portions of the elements 86 and 87 are also provided above and below the clearance recesses 95 with upper and lower vertically aligned web engaging surfaces 96 which engage the pair of diverging webs positioned therebetween and move them to, and support them in, a vertical plane containing the axis 57 (FIG. 7).

After the capacitor 20 has been wound, severed and sealed from the webs 21 and 22 (FIG. 10) in a manner to be more fully described hereinafter, the arbor sections 35–1 are withdrawn from the capacitor 20 by the actuators 71, and the cradle 40 and the arbor sections 35–1 are moved by the cams 54 to the upper position as shown in FIG. 7 with the relatively short portions 97 of the leading ends of the webs extending downwardly from the arbor 35 and the positioning elements 86, 87. The arbor sections 35–1 are then moved axially by the actuators 71 to closed position after which a cam 99 on the cam shaft 55 actuates a switch 100 of the control circuit 76 to effect the operation of the motor 82 and the rotation of the arbor 35 at a slow speed to wind portions of the webs 21, 22 thereonto.

To prevent the wrinkling of the depending portions 97 of the webs 21, 22 during the winding thereof, a pair of members 101 and 102 (FIGS. 7 to 10) are provided for engaging therebetween the depending webs 97 along a line below and in spaced relation to the bottom of the arbor 35. The member 101 is secured to the bottom of the element 86 at one end thereof and has a flat vertical surface 103 in alignment with the web engaging surface 96. The other member 102 is in the form of a roller of soft resilient material and is rotatably supported by a bracket 104 which is yieldably supported on the element 87 for limited horizontal movement. Thus, while the web positioning elements 86, 87 are in closed position, and as the arbor 35 rotates and winds the webs 21, 22 thereonto, the depending portions 97 of the moving webs are yieldably pressed flat against each other and the flat member 101 by the soft roller 102.

After the leading end of the webs have been wound onto the rotating arbor, the web-positioning elements 86, 87 are actuated by the cams 92, 93 and springs 94 to retracted positions (FIG. 8), at which time a cam 105 on the cam shaft 55 actuates a switch 106 of the control device 76 to effect the de-energization of the clutch device 59 and the stopping of the cam shaft 55. As the web-positioning elements are moved to their retracted positions, a cam 107 actuates a switch 108 of the control device 76 from a condition in which the motor 82 and the arbor 35 are operating at low speed to a condition in which the motor and the arbor are operating at high speed. The arbor is rotated a predetermined number of times under guidance of the control device 76 which includes a revolution counter (not shown) operatively connected to the arbor and selectively settable within predetermined limits.

When the arbor 35 has been rotated a prescribed number of revolutions to wind predetermined lengths of the webs 21, 22 thereonto, the control device 76 serves to effect the stopping of the motor 82 and the arbor 35 and also to effect the energization of the clutch device 59 and the rotation of the cam shaft 55.

In response to the rotation of the cam shaft 55, a cam 110 thereon actuates a switch 111 which effects the actuation of an electrically operated valve 112 and the operation of an actuator 113 on the cradle 40 (FIGS. 1 and 3). A cut-off bar 115 secured to the piston 116 of the actuator is thereby advanced along a path above and parallel to the arbor 35 from a normal retracted position to a forward position between the diverging webs 21 and 22 (FIG. 8).

Immediately after the cut-off bar 115 has been advanced to its forward position, the cams 54 effect the movement of the cradle 40 with the arbor 35 and the cut-off bar 115 thereon to the lower position (FIG. 9). The cam 92 then advances the web-positioning element 86 to the forward position as indicated in dotted lines in FIG. 9 to effect the proper placement of the web 21 prior to the severance of the capacitor 20 therefrom.

In its lower position the cut-off bar 115 is in the path of horizontal movement of and cooperates with a shear blade 124 having a serrated cutting edge to partially shear or perforate and thus weaken the web 21 along a horizontal line. The shear blade 124 is secured to one end of a slide 125 (FIG. 4) mounted for horizontal movement on the underside of the horizontal frame plate 91 and is urged forward by a spring 126. At the other end thereof the slide 125 is connected through a link 127 to a lever 128 which is pivotally supported intermediate its ends and has a follower riding on a cam 129 that cooperates with the spring 126 to effect the reciprocation of the shear blade 124.

As shown in FIGS. 4 and 9 to 10, a pad 128 of resilient material is secured to the upper forward portion of the shear blade 124 for movement therewith and serves to clamp against the cut-off bar 115 the portion of the web 21 above the shear blade 124 so as to firmly hold the end of the web supply upon completion of the subsequent severance of the web 21. Thereafter, the cam 93 effects the movement of the web-positioning element 87 to the closed position as indicated in dotted lines in FIG. 9 to bring the web 22 into engagement with the web 21 and in cooperation with the element 86 to support portions of the webs 21, 22 in vertical alignment with the axis 57.

Shortly thereafter a cam 130 on the cam shaft 55 actuates a switch 131 of the control device 76 to effect the actuation of the motor 82 and the rotation of the arbor 35 for a relatively short period of time. This effects the severance of the web 21 adjacent the shear blade 124, the winding of the trailing end portion of the severed web 21 onto the capacitor 20, and the winding of several convolutions of the web 21 onto the capacitor as the arbor 35 comes to rest.

To insure that the arbor sections 35–1 come to rest with the flat surfaces 39 thereof disposed vertically, a stop member 134 in the form of a collar having a pair of diametrically disposed shoulders 135 (FIGS. 1 and 5) is secured to the drive shaft 80 and cooperates with a movable stop element 136. This stop element is formed on one end of a slide 137 which is supported on one of the longitudinal members 44 of the cradle 40 and is urged by a spring 138 into engagement with the stop member 134 on the shaft 80. Connected to the slide 137 through a link 139 is a lever 140 which is pivoted at 140a and is actuated by a cam 141 on the cam shaft 55. The cam 141 cooperates with the spring 138 to effect the movement of the stop element 136 into engagement with the stop member 134 as the cam 130 effects the disconnection of the arbor drive and as the arbor 15 coasts to a stop. The cam 141 also effects the subsequent disengagement of the stop element 136 from the stop member 134 at an appropriate time.

Referring to FIGS. 5 and 10, an electrically heated sealing element 142 and a cut-off knife 143 are secured to one end of a slide 144 which is supported on the underside of the frame plate 91 for horizontal movement. At the other end thereof the slide 144 is operatively associated through a link 145 and a lever 146 with a cam 148 which cooperates with a spring 149 to effect the reciprocation of the slide 144. This, in turn, effects the severance of the web 22 adjacent the capacitor roll 20 by the cut-off knife 143 and the sealing of the trailing severed end thereof onto the capacitor 20 by the sealing element 142.

Thereafter, the arbor sections 35–1 are moved axially by the actuators 71 to the open position to effect the withdrawal of the arbor sections from the capacitor in cooperation with the stripping members 42, thereby leaving the capacitor free to drop into a receptacle therefor.

Operation

Upon completion of the fabrication of a capacitor 20 (FIG. 10) and following the axial withdrawal of the arbor sections from the capacitor, the cradle 40 is raised to the upper position with the arbor sections 35–1 coincident with the fixed axis 57 and with the flat mating surfaces 36 of the arbor sections disposed vertically (FIG. 7), after which the arbor sections are moved axially into closed or winding position on opposite sides of the portion of the webs 21, 22 supported between the positioning elements 86 and 87. The arbor 35 is then rotated through several revolutions at a low rate of speed to wind a portion of the leading ends 97 of the webs 21 and 22 thereon, after which the positioning elements 86 and 87 are moved away from the arbor to the open position (FIG. 8) and the arbor is rotated at an increased rate of speed to complete a predetermined number of turns and to wind a predetermined length of the webs 21 and 22 thereon as shown in dotted lines in FIG. 8 until the arbor is stopped under control of the device 76. During the initial portion of the winding of the webs onto the arbor the depending portions 97 of the webs are maintained in flat and unwrinkled condition by the roller 102 and the member 101 on the web-positioning elements 87 and 86. The cut-off bar 115 is then advanced to its forward position between the diverging webs 21 and 22 as shown in FIG. 8, after which the cradle 40 is lowered with the arbor and the cut-off bar 115 to the lower position as indicated in FIG. 9. The web-positioning element 86 is then advanced to the dotted line position indicated in FIG. 9 to locate a portion of the web 21 vertically in alignment with the fixed axis 57. Thereafter, the shear blade 124 is advanced to the dotted line position shown in FIG. 9, and cooperates with the cut-off bar 115 to partially shear the web 21 adjacent the lower edge of the cut-off bar 115 and to cause the resilient pressure pad 128 to press the web 21 against the cut-off bar 115.

Thereafter, the arbor 35 is rotated for a short period of time under control of the cam 130, and the stop element 136 is actuated and cooperates with the stop member 134 to stop the arbor sections 35–1 in a predetermined position with the flat surfaces 36 thereof disposed vertically. This rotation of the arbor effects the severance of the web 21 adjacent the cut-off bar 115 and the winding of the trailing severed portion of the web 21 onto the capacitor 20, and the winding of several convolutions of the web 22 around the capacitor to form a protective layer therearound.

The web-positioning element 87 is then moved to the dotted line position shwon in FIG. 9 to carry a portion of the web 22 into engagement with the web 21 and in cooperation with the element 86 to support the webs 21 and 22 in a vertical plane containing the fixed axis 57. Thereafter, the slide 144 is actuated to advance the cut-off knife 143 and the sealing element 142 to effect the severance of the web 22 adjacent the capacitor 20 and the sealing of the web 22 to the capacitor. Following this the shear blade 124, the cut-off bar 115, and the sealing element 142 and cut-off knife 143 are sequentially retracted, and the arbor elements 35–1 are withdrawn from the capacitor 20 to complete the cycle of operation.

It is to be understood that the above-described arrangements are simply illustrative of the application of the principles of this invention. Numerous other arrangements may be readily devised by those skilled in the art which embody the principles of the invention and fall within the spirit and scope thereof.

What is claimed is:
1. In an apparatus for winding a pair of webs:
    a pair of arbor sections mounted for rotation about a horizontal axis and movable to and from a closed position for receiving the webs therebetween and cooperable in the closed position to form a longitudinally split arbor for winding the webs thereon;
    means for guiding the webs from supplies thereof to said arbor in laterally spaced and converging relation to each other;
    means for rotating the arbor;
    means for moving said arbor sections axially to and from closed position;
    a pair of web-positioning elements mounted on opposite sides of said axis for movement toward and away from each other and said axis and having cooperable surfaces below said axis and cooperable surfaces above said axis engageable with the webs for moving the webs into engagement with each other and positioning the webs in alignment with said axis; and
    means for moving said web-positioning elements toward and away from said axis.

2. In an apparatus for winding a pair of webs:
    a pair of arbor sections mounted for rotation about a horizontal axis and movable to and from a closed position for receiving the webs therebetween and cooperable in the closed position to form a longitudinally split arbor for winding the webs thereon;
    means for guiding the webs from supplies thereof to said arbor in laterally spaced relation to each other;
    a pair of web-positioning elements mounted on opposite sides of said axis for movement toward and away from each other and said axis and having cooperable surfaces below said axis and cooperable surfaces above said axis engageable with the webs for moving the webs into engagement with each other and positioning the webs in alignment with said axis and with the leading portions of the web extending from said axis; and
    a pair of members mounted on said elements for movement therewith for engaging the end portions of the webs in spaced relation to said axis for yieldably urging the webs into engagement with each other to prevent the wrinkling thereof during the winding of the end portions onto the arbor.

3. In an apparatus for winding a pair of webs:

a pair of arbor sections mounted for rotation about a horizontal axis and movable to and from a closed position for receiving the webs therebetween and cooperable in the closed position to form a longitudinally split arbor for winding the webs thereon;

means for guiding the webs from supplies thereof to said arbor in laterally spaced and converging relation to each other;

a pair of web-positioning elements mounted on opposite sides of said axis for horizontal movement toward and away from each other and said axis and having cooperable surfaces below said axis and cooperable surfaces above said axis engageable with the webs for moving the webs into engagement with each other and positioning the webs vertically in alignment with said axis and with leading portions of the web extending downwardly from said axis;

a member extending downwardly from one of said elements and having a surface in vertical alignment with said web engaging surfaces on said one element;

a roller of resilient material; and means for yieldably mounting said roller below said other element for movement therewith and for limited horizontal movement relative thereto and cooperable with said member on said one element for releasably supporting the webs therebetween in engagement with each other below and in spaced relation to the axis to prevent the wrinkling of the portions of the webs extending from said arbor as such portions are being wound onto said arbor.

4. In an apparatus for winding a pair of webs:

a pair of axially aligned arbor sections cooperable in a closed position to form a longitudinally split arbor for winding the webs thereon;

a carrier movable to first and second positions for supporting said arbor in an upper position with said arbor in coaxial alignment with a fixed axis and in a lower position with said arbor below the axis and for axial movement of said arbor sections relative to each other to and from open and closed positions;

means for rotating said arbor;

means for moving said arbor sections axially to and from open and closed positions;

means for guiding the webs from supplies thereof to said arbor in converging relation to each other;

a pair of web-positioning elements mounted on opposite sides of the axis for horizontal movement toward each other and the axis and having cooperable vertically spaced web engaging surfaces above and below the axis for moving portions of the webs into engagement with each other and for supporting such portions of the webs in vertical alignment with the axis and providing clearance vertically therebetween for the reception of said arbor;

means for moving said web-positioning elements toward and away from the axis; and means for severing the webs between the axis and said arbor when said carrier in in the lower position.

5. The structure as defined in claim 4 including the provision of:

a member extending downwardly from one of said elements and having a surface in vertical alignment with said web engaging surfaces of said one element; and a roller of resilient material mounted on and below said other element and cooperable with said member on said one element for releasably supporting the webs therebetween in engagement with each other below and in spaced relation to the axis to prevent wrinkling of the portion of the webs extending downward from said arbor as such portions are being wound onto said arbor.

6. The combination defined in claim 4 including a guide member mounted on the lower portion of one of said positioning elements; and a guide member mounted on the lower side of the other of said positioning elements, at least one of said guide members being yieldable and cooperating with said other guide member for engaging therebetween successive portions of the webs below and in spaced relation to said arbor for releasably supporting the webs in a flat condition to prevent wrinkling of the webs as they are wound onto said arbor.

7. In an apparatus for winding capacitors:

a pair of arbor sections cooperable in a closed position to form a longitudinally split arbor for winding capacitor forming webs thereon;

a carrier for supporting said arbor sections in axial alignment with and for axial movement relative to each other to and from a closed position;

means for moving said carrier to an upper position with said arbor in coaxial alignment with a fixed axis and to a lower position with said arbor beneath the axis;

means for guiding a pair of the webs from supplies thereof downward to said arbor;

a pair of web-positioning elements mounted on oppsite sides of the axis for horizontal movement toward each other and the axis and having vertically spaced web engaging surfaces above and below the axis for supporting the webs therebetween vertically and in alignment with the axis and providing clearance vertically between said web engaging surfaces for the reception of said arbor;

means for moving said elements to and from the axis;

means for shearing the webs adjacent said arbor when said arbor is in the lower position;

means for moving said arbor sections axially;

means for rotating said arbor sections;

means for stopping the rotation of said arbor sections with the plane of separation between said arbor sections disposed vertically; and control means for effecting the actuation of said carrier actuating means, said web severing means, said arbor moving means, said arbor rotating means, and said arbor stopping means in a predetermined sequence.

8. A capacitor winding apparatus comprising:

a pair of arbor sections cooperable in closed position to form a longitudinally split arbor for winding a pair of capacitor forming webs thereon;

a carrier for supporting said arbor sections in axial alignment with each other and for axial movement relative to each other to and from a closed position;

meas for guiding the pair of webs from supplies thereof downwardly to said arbor in spaced relation to each other;

a cut-off bar mounted on said carrier above said arbor for movement parallel thereto from a normal retracted position spaced from the webs to a forward position between the webs;

means for actuating said carrier to an upper position with said arbor in coaxial alignment with a fixed axis and to a lower position with said arbor and said cut-off bar below the axis;

a pair of web-positioning elements mounted on opposite sides of the axis for movement toward each other and the axis to a closed position and having vertically spaced web engaging surfaces above and below said axis cooperable in the closed position of said elements to support the webs therebetween vertically in alignment with the axis and providing clearance between said web engaging surfaces for the reception of said arbor;

means for moving said web-positioning elements to and from closed position;

a shear member cooperable with said cut-off bar in the lower position of said carrier for shearing one of the webs;

resilient means mounted on said shear member for gripping the one web against said cut-off bar;

means for actuating said shear member;

means for moving said arbor sections axially to and from closed position;

means for rotating said arbor sections;

means for stopping the rotation of said arbor sections with the plane of separation between said sections disposed vertically; and means for severing the other web between the arbor and the web supply.

9. The apparatus as defined in claim 8 including the provision of control means for effecting the actuation of said carrier actuating means, said shear member actuating means, said web severing means, said arbor moving means, said arbor rotating means, and said arbor stopping means in timed relation to one another.

References Cited by the Examiner
UNITED STATES PATENTS 2,950,070  8/60  Thorson et al. _____ 242—56.1
3,113,740 12/63  Hinds _____ 242—56.1

FOREIGN PATENTS 668,145  3/52  Great Britain.

References Cited by the Applicant
UNITED STATES PATENTS 2,199,603  5/40  Ackley.
2,205,171  6/40  Kile et al.

MERVIN STEIN, *Primary Examiner.*